Patented June 30, 1942

2,288,580

UNITED STATES PATENT OFFICE 2,288,580

PRODUCTION OF UNSATURATED COMPOUNDS

Hans Baehr, Ludwigshafen-on-the-Rhine, and Wilhelm Deiters, Leuna, Germany

No Drawing. Application September 26, 1939, Serial No. 296,627. In Germany September 15, 1938

5 Claims. (Cl. 260—680)

The present invention relates to the production of unsaturated compounds.

In the preparation of unsaturated compounds by splitting off hydrogen halide under the action of heat from aliphatic or cycloaliphatic halogen-hydrocarbons or aromatic halogen-hydrocarbons containing the halogen in a side chain containing at least two carbon atoms, if necessary in the presence of catalysts promoting the splitting off of hydrogen halide, it has already been proposed to use diluent gases, such as nitrogen or carbon dioxide.

We have now found that the splitting off of hydrogen halide from halogen-hydrocarbons containing the halogen combined with non-aromatic carbon atoms at elevated temperatures proceeds especially rapidly and with good yields by carrying it out under substantially anhydrous conditions in the presence of hydrogen halide, if necessary with the aid of catalysts promoting the splitting off of hydrogen halide. On the bases of the mass-action law it would have been expected that such a measure would check the splitting off of hydrogen halide in accordance with the equilibrium:

$$R.CH_2-CH_2Cl \rightleftharpoons R.CH=CH_2 + HCl$$

Contrary to expectation, however, under otherwise identical conditions the results are more favorable with the addition of hydrogen halide than with the addition of the inert gases hitherto used. The invention also offers the advantage that a diluent gas can be used which in any case is formed in the reaction and for which additional separation measures are not necessary.

Suitable initial materials for the process are saturated or unsaturated mono- or poly-halogen-hydrocarbons of the paraffine or cyclo-paraffine series, e. g. mono- and dichlor-butanes, chlorpentanes or chlorhexanes or mono- or dichlor-cyclohexane, and also halogen olefines, such as chlorbutylene, and also araliphatic halogenated hydrocarbons with aliphatically combined halogen, i. e. mixed aromatic-aliphatic halogen-hydrocarbons which contain the halogen in the aliphatic portion, as for example chlorethylbenzene. Mixtures of such compounds may also be used, preferably those having the same carbon number.

The reaction may be carried out in vessels, as for example tubes or coils, of ceramic material or of acid-proof metals or metal alloys. These vessels may be heated externally or also brought to the necessary high temperature by direct electric resistance heating. It is also possible to work in chambers periodically brought to high temperatures directly by heating gases. If desired working may be effected in the presence of catalysts. Among these there may be mentioned for example the halides of metals, such as copper, lead, calcium, zinc, cadmium, aluminum, tin, manganese, nickel, iron, cobalt, bismuth or mixtures of the same, which may be applied to carriers, and also activated oxides, ceramic masses of acid or basic nature, substances having large surface, such as silica gel, active carbon or pumice, and also silicon carbide or coke. In all cases working is effected in the absence of appreciable amounts of water.

The reaction temperatures depend on the nature of the initial materials and the desired result. Generally speaking temperatures between about 200° and 800°, advantageously between 450° and 700° C. are used. At low temperatures within the said range, as for example between 450° and 550° C., it is usually possible to split off only one molecule of hydrogen halide, i. e., for example to obtain butylene from butyl chloride, styrene from chlorethylbenzene or butenyl chloride from dichlorbutane. By raising the temperature, for example to from 550° to 700° C., it is possible, when monohalides are used as initial materials, to split off hydrogen in addition to hydrogen halide and thus for example to convert propyl chloride into allene or butyl chloride into butadiene. The halogen-hydrocarbons are also converted under the said conditions into diolefines by the splitting off of two molecules of hydrogen halide, while diolefines are also obtained from monohalogen-olefines. Thus the production of butadiene from dichlor-n-butane may be carried out by exposing varporous dichlor-n-butane to temperatures exceeding 500° C. but below those at which substantial splitting of the carbon chain occurs in the presence of hydrochloric acid.

The hydrogen halide is preferably mixed with the initial halogen-hydrocarbon in the ratio by volume of from 1 to 10:1 (calculated as gas). Still larger amounts of hydrogen halide may be used. If the halogen-hydrocarbon is liquid under normal conditions, it is preferable, when mixing the components, to lead the gaseous hydrogen halide through the halogen-hydrocarbon which is thus entrained corresponding to its vapor pressure by the hydrogen halide serving as carrier gas. The temperature of the liquid halogen-hydrocarbon is regulated so that the desired ratio is obtained in the mixture. The hydrogen halide which is led through may also be cooled or preheated as desired before its mixing with the halogen-hydrocarbon. Finally the mixture of the components may be preheated before entry into the reaction vessel. The halogen-hydrocarbon may be sprayed into preheating chambers, vaporized therein and then mixed with hydrogen halide, which if desired may also be preheated.

In any case the mixing should be effected as carefully as possible. For this purpose the mixture prepared in one of the abovementioned ways may be led at a high speed, for example at from 1 to 100 metres or more per second, through a preheated additional mixing device, as for example through vessels provided with filling bodies or baffles or through tubes with inserted rifled liners or through tubes which are alternately constricted and widened.

The initial mixture thus obtained is supplied to the reaction vessel, if desired in a heated condition, and advantageously led at a high speed to the place at which the splitting is initiated by thermal action or by contact with heated catalysts. For example the mixture may be led against a glowing body brought to the necessary temperature by indirect heating or by an electric current or against a flame, as for example a chlorine detonating gas flame, or over a built-in spark gap. It is possible to work at atmospheric, increased or reduced pressure. It is also possible to work continuously by leading the hydrogen halide in a cycle, supplying the halogen-hydrocarbon at one place and separating the unsaturated compound at another place. The halogen-hydrocarbons not reacted during the splitting off of hydrogen halide are separated by cooling and may be returned directly to the initial halogen-hydrocarbons or used for quenching the gases leaving the reaction vessel. In this way hydrogen halide is split off therefrom whereby additional amounts of olefines or diolefines are obtained.

The olefines and diolefines prepared according to this invention may be freed from the last traces of hydrogen halide with the aid of solid alkalies in known manner and from unconverted halogen-hydrocarbons by cooling. They are then preferably liquefied by further cooling under pressure and freed from small amounts of accompanying methane, acetylene, hydrogen and in some cases ethylene by distillation.

The process according to this invention may advantageously be used in conjunction with the preparation of dihalogen-hydrocarbons from olefines mixed with saturated hydrocarbons which are treated at below about 100° C. with halogen in the presence of hydrogen halide. The dihalogen-hydrocarbons thus formed together with the monochlor-hydrocarbons and saturated and unsaturated hydrocarbons formed as by-products may be mixed with hydrogen halide and subjected to the process according to the present invention, whereby diolefines and mono-olefines are obtained by the splitting off of hydrogen halide. The mono-olefines, mixed with hydrogen halide, may be returned in circulation to the stage at which halogen is added on.

The mixtures containing dihalogen-hydrocarbons obtained by adding halogen on olefines admixed with paraffines in the presence of hydrogen halide may also be immediately subjected at elevated temperature to the splitting off of hydrogen halide without separation into their single components. It is thus possible to make use of the hydrogen halide which accompanies the dihalogen-hydrocarbons directly in the splitting off of hydrogen halide. Moreover by working in a cycle, the hydrogen halide is freed to an increasing extent from entrained hydrocarbons so that it may be more easily converted into halogen.

In order to avoid too strong a dilution of the initial hydrocarbons by hydrogen halide when working continuously and to maintain a uniform hydrogen halide content in the cycle, hydrogen halide may be separated from the unsaturated compound continuously or periodically. This may be effected for example by washing or by distillation of the liquefied final mixture under pressure. The hydrogen halide thus obtained may be converted into halogen, for example according to the Deacon process or by electrolysis, and be used again for the adding on of halogen to olefines or for substitutional halogenation of paraffinic hydrocarbons.

The following examples will further illustrate how the said invention may be carried out in practice but the invention is not restricted to these examples.

*Example 1*

The vapors of 30 kilograms of monochlor-normalbutane heated to 200° C. and 30 cubic metres of hydrogen chloride are led per hour into a chamber of acid-proof steel heated to 525° C. with fire gases. The throughput is 1 kilogram of chlorbutane to 1 litre of reaction space. With a 95 per cent conversion there is obtained a mixture of butylene and hydrogen chloride from which the butylene may be separated, by the adding on of chlorine in the cold, as dichlorbutane. The residual hydrogen chloride is again led into the reaction vessel and meets the initial material therein. Such an amount of hydrogen chloride is removed from the cyclic process that on an average 30 cubic metres of hydrogen chloride enter the reaction chamber with the monochlorbutane per hour. The splitting off process proceeds so protectively that less than 0.5 per cent of cracking gases are obtained. The excess of hydrogen chloride is absorbed with water. The resulting concentrated hydrochloric acid is converted by electrolysis into chlorine which serves for the preparation of fresh monochlorbutane.

*Example 2*

Over a graphite rod which is heated to red heat (about 600° C.) by electric resistance heating and which is situated in a thermally insulated silicon carbide tube there are led per hour the vapors of 35 kilograms of n-dichlorbutane obtained by adding chlorine onto n-butylene which are preheated to 250° C. together with 20 cubic metres of hydrogen chloride. With an 80 per cent conversion there is obtained a mixture containing 1.3-butadiene in an 88 per cent yield. The gas mixture is freed from hydrogen chloride and purified. 20 cubic meters of the hydrogen chloride are again supplied to the reaction tube and mixed therein with fresh dichlorbutane. The excess of hydrogen chloride is converted into chlorine by the Deacon process; the chlorine serves for the preparation of n-dichlorbutane from n-butylene. The reaction is moderated by the presence of the hydrogen chloride to such an extent that less than 3 per cent of cracking gases are formed.

*Example 3*

20 cubic meters of n-butane and 10 cubic meters of chlorine are led per hour through a nozzle into a narrow insulated stoneware tube with a high speed of flow, whereby a vigorous reaction sets in. The heat thus set free is used for heating a second chamber which is charged with 40 liters of granular barium chloride. Through this chamber the mixture obtained by the chlorination and consisting of n-butyl chloride, n-butylene, butane and hydrogen chloride is led without intermediate treatment, whereby a temperature of 430° C. is set up. 90 per cent of the butyl chloride are thus converted into n-butylene. The mixture consisting of n-butylene, n-butane and hydrogen chloride escaping from this chamber is cooled and is brought into contact at 30° C. with 28 kilograms of chlorine per hour, whereby 47 kilograms of n-dichlorbutane separate.

If the temperature of the splitting off reaction be kept at about 550° C., the butyl chloride is partly converted into 1.3-butadiene. After absorption of the hydrogen chloride by means of caustic soda solution, a gas is obtained which contains 26 per cent of butadiene, 55 per cent of butylene and 19 per cent of hydrogen, methane and acetylene.

What we claim is:

1. A process for the production of unsaturated compounds which consist in adding an appreciable amount of hydrogen halide as a diluent to a vaporous halogen hydrocarbon containing the halogen combined with non-aromatic carbon atoms and exposing this mixture to high temperatures under substantially anhydrous conditions.

2. A process for the production of unsaturated aliphatic compounds which consists in adding an appreciable amount of hydrogen chloride as a diluent to a vaporous aliphatic chloro-hydrocarbon and exposing this mixture to high temperatures under substantially anhydrous conditions.

3. A process for the production of unsaturated aliphatic compounds which consists in adding an appreciable amount of hydrogen chloride as a diluent to a vaporous saturated aliphatic chlorohydrocarbon containing four carbon atoms and exposing this mixture and at most two chlorine atoms to high temperatures under substantially anhydrous conditions.

4. A process for the production of unsaturated aliphatic compounds which consists in adding an appreciable amount of hydrogen chloride as a diluent to a vaporous saturated aliphatic chlorohydrocarbon containing four carbon atoms and exposing this mixture and at most two chlorine atoms to high temperatures under substantially anhydrous conditions and in the presence of a catalyst promoting the splitting off of hydrogen chloride.

5. A process for the production of butadiene which consists in adding an appreciable amount of hydrogen chloride as a diluent to vaporous n-dichlorbutane and exposing this mixture to temperatures exceeding 500° C. but below those at which substantial splitting of the carbon chain occurs under substantially anhydrous conditions.

HANS BAEHR.
WILHELM DEITERS.